April 15, 1952     H. A. LEHMANN     2,593,318

PHOTO AND PHOTO-TRANSPARENCY ENLARGING DEVICE

Filed June 4, 1949     3 Sheets-Sheet 1

INVENTOR
HELMUTH A. LEHMANN
BY
ATTORNEY

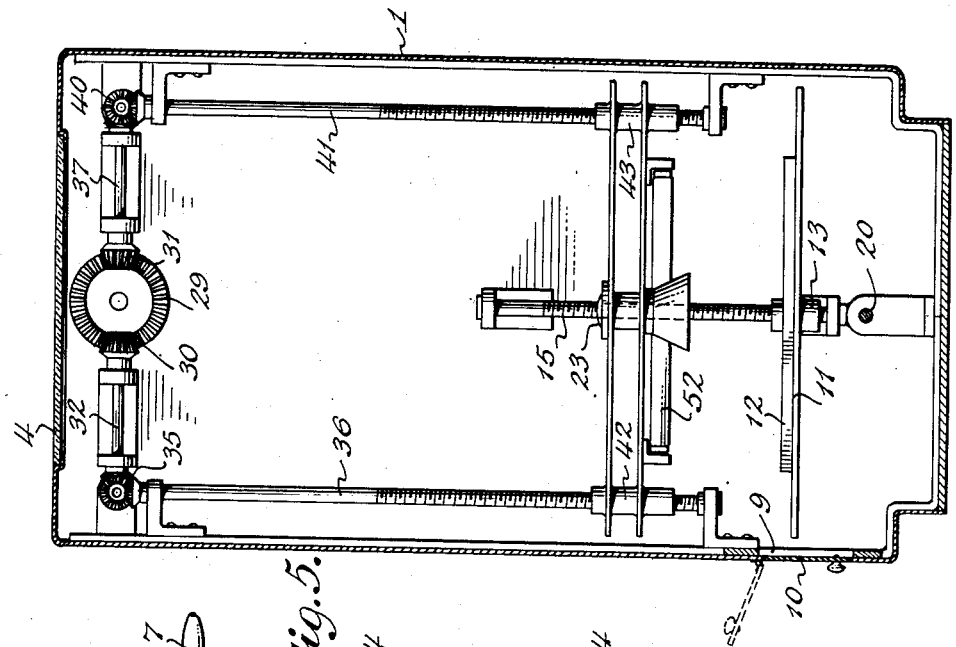

April 15, 1952 H. A. LEHMANN 2,593,318
PHOTO AND PHOTO-TRANSPARENCY ENLARGING DEVICE
Filed June 4, 1949 3 Sheets-Sheet 3
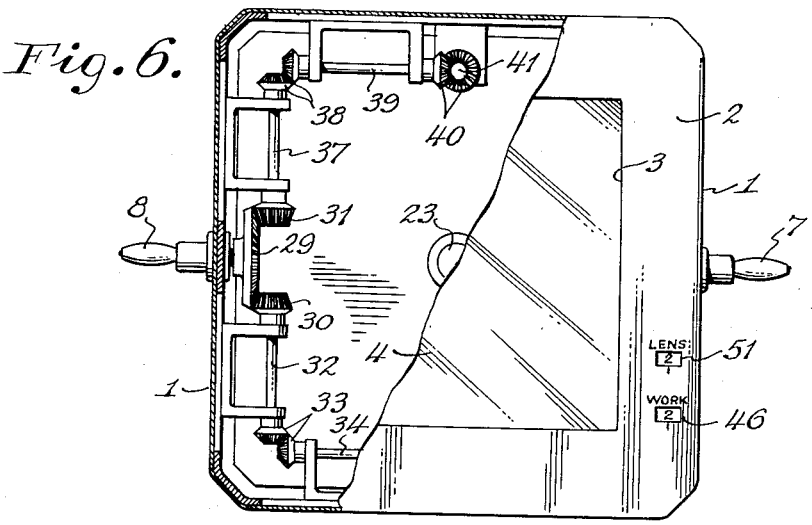
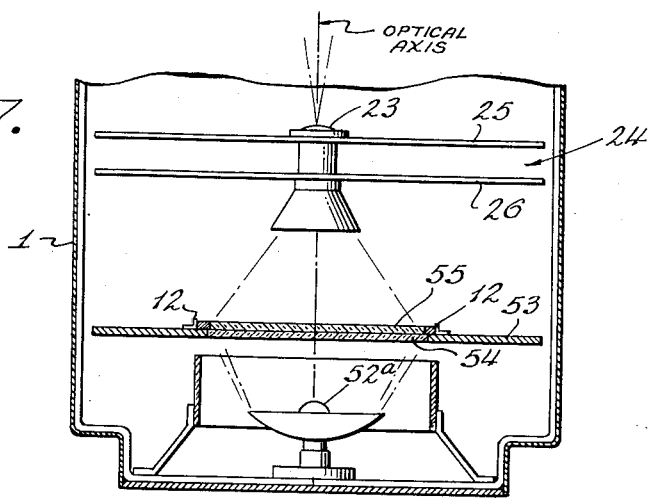
INVENTOR
HELMUTH A. LEHMANN
BY
ATTORNEY Patented Apr. 15, 1952

2,593,318

UNITED STATES PATENT OFFICE 2,593,318

PHOTO AND PHOTO-TRANSPARENCY ENLARGING DEVICE

Helmuth A. Lehmann, New York, N. Y.

Application June 4, 1949, Serial No. 97,176

1 Claim. (Cl. 88—24)

My invention particularly relates to those types of enlarging devices in which a photographic print or like object, generally considered opaque as compared to photographic transparencies, are illuminated and the image thereof projected in detail upon an image plate which may consist of a ground glass screen.

It is an object of this invention to provide a reflex photo enlarger of the foregoing type which is of simple construction and which may be expediently but accurately adjusted to provide desired magnitudes of enlargement with correct focussing of the image upon the image plate.

More particularly, it is an object of this invention to provide an enlarger of the foregoing character which comprises a vertically extending cabinet having an image plate in the top thereof and a lens support and object-holding platen, the two latter elements being movably mounted within said cabinet and relatively adjustable with respect to each other and the image plate along the focal axis of the lens.

Another object resides in providing a device of the foregoing character which includes calibrated scales movable respectively with the lens and the object-holding platen, each being adapted to register with a window in the top of said cabinet and supply, by virtue of the calibrations thereon, an accurate indication of the correct relative spacing of the object and lens relative to the image plate for desired magnitudes of enlargement.

With the foregoing and other objects in view, my invention includes the novel elements and the combinations and arrangements thereof described below and illustrated in the accompanying drawings, in which:

Fig. 4 is a vertical sectional view of my invention;

Fig. 5 is a vertical sectional view taken at right angles to that shown in Fig. 4;

Fig. 6 is a plan view, partially broken away and in section; and

Fig. 7 is a fragmentary vertical sectional view through a modification of my invention.

Figure 1:
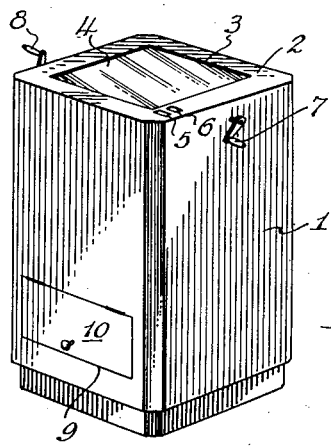
Fig. 1 is a perspective view of a preferred embodiment of my invention.

In accordance with the preferred embodiment of my invention, I provide a generally rectangular, vertically extending cabinet indicated at 1, the top 2 of which has an opening 3 therein within which is mounted an image plate 4 of ground glass or other suitable material. Also, in the top of said cabinet I preferably provide a window opening or a pair thereof as indicated at 5 and 6 through which an operator can ascertain by means of suitably calibrated scales, as hereinafter described, whether or not the enlarger is properly adjusted for a desired magnitude of enlargement. Operating handles 7 and 8 extend exteriorly of the cabinet for operating purposes as hereinafter described. Additionally, an opening 9 is formed in the front of the cabinet and provided with a suitably hinged door or closure 10 by means of which the object may be inserted within the cabinet.

Figure 2:
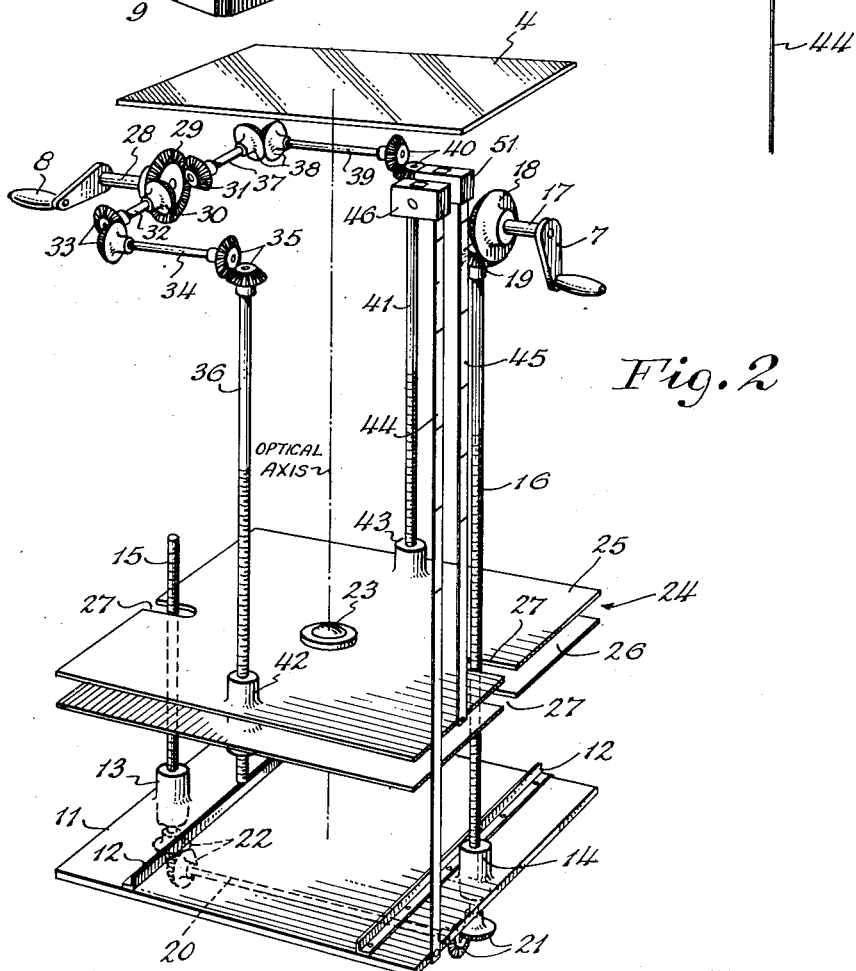
Fig. 2 is a somewhat schematic perspective view of the elements mounted within the cabinet of Fig. 1 and illustrating one form of operating mechanism.

It will be understood that from an optical standpoint, my invention comprises an image plate, a lens, and an object holder, all of which are mounted within cabinet 1. These parts are schematically shown in Fig. 2 in the relative positions which they will occupy within the cabinet, Figs. 4 and 5 of course showing the complete assembly. Referring to Fig. 2, however, it will be observed that the image plate 4 represents the top of the cabinet. An object holding platen 11, which may be formed of wood as well as metal or any other suitable material, is preferably provided with angle members 12 between which the object is adapted to be positioned and retained on the platen. The object, of course, may be any opaque photograph or print. The platen may be rectangular or square to conform generally to the configuration of the cabinet 1. The platen also is provided on opposite sides thereof with interiorly threaded bosses 13 and 14 which are adapted to ride on and threadedly engage screw rods or worms 15 and 16 whereby rotation of the screw rods in one direction or the other effects movement of the platen along the optical axis of the lens, hereinafter described, and toward or away from the image plate 4. Preferably, the platen is actuated by means of crank 7, which is disposed exteriorly of the cabinet and is connected by means of shaft 17 with miter gear 18 meshing with miter gear 19 which, in turn, is secured to the rod 16. All of the gears and rods hereinafter described including those above referred to are preferably mounted within the cabinet 1. The lower end of rod 16 is drivably connected with a transverse connecting shaft 20 by means of miter gears 21. Shaft 20 in turn is drivably connected with rod 15 by means of miter gears 22. From the foregoing it will be understood that rotation of the crank 7 in one direction or the other will lower or elevate the platen 11.

An enlarging lens 23 is mounted in a lens support indicated generally at 24 which in the embodiment illustrated comprises a pair of spaced opaque plates 25 and 26 which may be of such size and configuration as to approximate the size and configuration of cabinet 1 while permitting free movement of the plates vertically within said cabinet. Both of these plates are connected together to move as a unit and are provided with a cut out 27 on opposite sides thereof to accommodate the vertically extending rods 15 and 16. The plates 25 and 26 are so arranged as to form a light trap to prevent light from passing around the lens 23. The lens holder 24 is also movable like platen 11 along the focal axis of the lens 23 and the vertical adjustment thereof is accomplished by means of the crank 8 which is connected through shaft 28 to miter gear 29 which engages two miter gears 30 and 31. Gear 30 is drivably connected by means of shaft 32, miter gears 33, shaft 34 and miter gears 35 to a vertically extending screw rod or worm 36. Likewise, gear 31 is drivably connected through shaft 37, miter gears 38, shaft 39 and miter gears 40, with a vertically extending screw rod or worm 41. The lens support 24 is provided with interiorly threaded bosses 42 and 43 which ride upon and threadedly engage the screw rods 36 and 41, respectively.

By the foregoing actuating means, the lens and the object-holding platen may be independently adjusted with respect to the image plate 4 so that a desired magnitude of enlargement of the object may be obtained and the image presented in focus on the image plate 4. If the enlarged image is to be reproduced by printing, tracing or the like, the tracing or photo paper may be placed upon the image plate 4.

Figure 3:
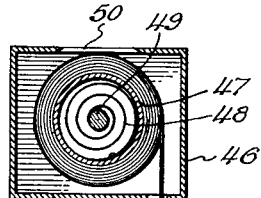
Fig. 3 is a sectional view of one form of scale retracting mechanism.

Further, in accordance with my invention I provide means whereby the proper adjustment, both of the lens and the object-holding platen relative to the image plate, is indicated to the operator to provide a properly focussed image of the desired magnitude of enlargement. In the preferred embodiment shown herein, this means comprises a pair of scales 44 and 45, the lower end of the scale 44 being connected with the object holding platen 11 and the lower end of scale 45 being connected with the lens support 24. The opposite ends of these scales, as shown in Fig. 3, are wound respectively upon drums which are spring actuated to supply tension to the scales and wind them upon the drum as the platen or lens support is elevated. For example, as shown in connection with scale 44, it is arranged to pass upwardly into an enclosure 46 within which drum 47 is rotatably mounted. A spring 48 is connected between the interior of drum 47 and a rod 49. Spring 48, of course, is biased to cause the scale to wind upon the drum 47 and, in so doing, it passes in registry with a window 50 in the top of the enclosure 46. As shown in Fig. 2, enclosure 46 receives the scale 44 and a second enclosure 51 receives the scale 45. The windows in these enclosures may constitute the windows 5 and 6 described in connection with Fig. 1 or they may be mounted in registry therewith.

The scales 44 and 45 are preferably so calibrated, as by means of numerical designations or other suitable indicia, and preferably with numerals representing the correct positioning of the associated object-holding platen or lens for predetermined magnitudes of enlargement corresponding to said numerals, that the matching of like calibrations of the two scales, as witnessed through the windows 5 and 6 will indicate that the separately adjustable platen and lens holder are correctly adjusted relative to image plate 4 so as to provide a properly focussed image and one which is enlarged to the desired degree. In other words, a matching of the calibrations of numerals 2, indicates correct adjustment of the parts for an enlargement of the object to twice its size. In this manner, the operator may readily and quickly adjust my enlarger to provide any desired magnitude of enlargement by noting the scales while, at the same time, the correct relative spacing of the lens and object-supporting platen relative to the image plate will result to provide correct focussing for the desired enlargement.

As shown in Figs. 4 and 5, I preferably obtain illumination for enlarging purposes by means of a suitable light source which is mounted beneath the lens support 24. In the embodiment illustrated, the light source is mounted on the lens support and comprises a pair of fluorescent lamps 52 which are preferably mounted on opposite sides of the optical axis of the lens or may be of circular configuration to provide fairly uniform light intensity on the face of the object. It will be understood that power supply lines, not shown, are connected with the lamps in such a manner as to allow free movement of the lens support vertically of the cabinet.

Further, in accordance with my invention, I may provide a light source 52a, as illustrated in Fig. 7, which is associated with a suitable reflector and mounted on the base of the cabinet 1. With this arrangement the object holding platen 53 which corresponds to platen 11, is provided with a centrally disposed opening therein within which is preferably positioned a light diffusing medium such as a ground glass plate 54. The object, of course, is arranged to be mounted to overlie the plate 54 and in this case the object will be a transparency whereby its image will be projected through the enlarging lens 23 and cast upon the image plate 4. If desired, the arrangement of Fig. 7 may be incorporated in the form of my invention shown in the preceding figures, in which case, switches will be provided whereby either type of illumination may be obtained and, if necessary, an opaque backing sheet may be interposed between the object-holding platen and the print, where such is deemed necessary, to obtain an image through reflection of light from the surface thereof.

It will be understood, of course, that my present invention can be used as a reducer to provide an image smaller than the object and that it is equally effective both to enlarge or reduce. Reduction or enlarging may be accomplished simply by so relatively adjusting the object, lens and image plate as to effect the desired ratio of image to object. Additionally, if desired, the lens or lens system may be inverted or optically modified or substitutions readily made therein to provide enlarging or reducing to the desired extent and with the resultant image in clear focus on the image plate when the parts are relatively adjusted to the proper spacings.

While I have described my invention in its preferred embodiments it is to be understood that the words which I have used are words of description rather than of limitation and that changes within the purview of the appended claim may be made without departing from the true scope and spirit of my invention in its broader aspects.

What is claimed is:

A photo-enlarger comprising a vertically extending, closed cabinet having an image plate in the top thereof, a movably mounted object-holding platen within said cabinet, a movably mounted opaque lens support, a lens mounted therein, said lens support comprising a pair of plates extending laterally substantially across said cabinet in relatively spaced relation and between said image plate and platen to block the passage of light around said lens, the side edges of the plates of the lens support being slightly spaced from the cabinet walls, a light source between said lens support and platen, a pair of vertically extending screw rods disposed within and respectively adjacent a first pair of opposite sides of said cabinet and cooperating screw threaded parts on opposite sides of said lens support, a second pair of vertically extending screw rods disposed within said cabinet and respectively adjacent the remaining pair of opposite sides of said cabinet, cooperating screw-threaded parts on opposite sides of said platen, crank members disposed exteriorly of said cabinet, miter gears and shafting connecting said cranks respectively with said pairs of screw rods whereby separate adjustments of said lens support and platen along the optical axis of said lens may be effected, a first indicator means for providing indications of the spacing of said lens support relative to said image plate and a second indicating means for providing indications of the spacing of said platen relative to said image plate.

HELMUTH A. LEHMANN.

REFERENCES CITED

The following references are of record in the file of this patent:

UNITED STATES PATENTS

| Number | Name | Date |
|---|---|---|
| 1,597,598 | Jones | Aug. 24, 1926 |
| 1,687,069 | Iser | Oct. 9, 1928 |
| 2,107,074 | Hineline | Feb. 1, 1938 |
| 2,176,910 | Levy | Oct. 24, 1939 |
| 2,303,518 | White | Dec. 1, 1942 |

FOREIGN PATENTS

| Number | Country | Date |
|---|---|---|
| 821,043 | France | Aug. 17, 1937 |